United States Patent

[11] 3,602,722

[72] Inventors Boris Grigorievich Kamenetsky
Kolokolnikov pereulok, 24, kv. 38;
Andrei Viktorovich Novikov, Bolshaya
Cherkizovskayaulitsa, 8, Korpus 2, kv. 73,
both of Moscow, U.S.S.R.
[21] Appl. No. 751,590
[22] Filed Aug. 9, 1968
[45] Patented Aug. 31, 1971

[54] DEVICE FOR AUTOMATIC CONTROL OF THE FIELD CONTACTORS OF DIESEL-ELECTRIC AND GAS TURBINE LOCOMOTIVES
5 Claims, 2 Drawing Figs.
[52] U.S. Cl. .................................................. 290/14, 322/25, 322/28
[51] Int. Cl. .................................................. B60l 11/06
[50] Field of Search .................................. 290/22, 31, 32, 46, 11, 14, 45; 322/25, 28

[56] References Cited
UNITED STATES PATENTS
| | | | |
|---|---|---|---|
| 2,981,882 | 4/1961 | Rosenblatt ................... | 322/25 X |
| 3,254,293 | 5/1966 | Steinbruegge et al. ....... | 322/25 X |
| 3,281,649 | 10/1966 | Barrett et al. ............... | 322/25 |

*Primary Examiner*—Oris L. Rader
*Assistant Examiner*—H. Huberfeld
*Attorney*—Waters, Roditi & Schwartz

ABSTRACT: A device for the automatic control of the field contactors of diesel-electric and gas turbine locomotive traction motors comprises a signal-forming unit including a network of resistors, a direct current transformer and a direct voltage transformer, first rectifier means coupling said direct current transformer to one part of the network, second rectifier means coupling another part of the network to said direct voltage transformer, the output of the signal-forming unit being connected to a changeover noncontact relay that opens and closes the circuit of the field contact coil.

DEVICE FOR AUTOMATIC CONTROL OF THE FIELD CONTACTORS OF DIESEL-ELECTRIC AND GAS TURBINE LOCOMOTIVES

The present invention relates to the electric drive system of self-powered locomotives. The herein-proposed device is designed for automatic control of the field contactors used for switching DC traction motors from full to weakened field conditions of operation and vice versa.

Known in the art and used on most diesel-electric and gas turbine locomotives for the control of field contactors are devices in the form of changeover electromagnetic differential relays that operate at direct supply of input signals to the relay coil from the drive power supply circuit (the generator voltage and the voltage drop across the electric power supply circuit being, consequently, in proportion to the generated current).

The device mentioned above has the following inherent disadvantages: a considerable temperature dependence of the relay-operating characteristics; the supply of a high voltage to the relay coil circuits; the use of break-make contacts, moving parts and springs that impair the stability and reliability of operation of the relay and necessitate its frequent adjustment and considerable size of the device.

A primary object of the present invention is to eliminate the above disadvantages.

A further object of the present invention is to provide a device for automatic field control of traction motors that has stable operating characteristics, a high reliability of operation, that does not require frequent adjustment, is free of circuit elements operating at high voltage and has a small weight and size.

In accordance with the present invention these and other objects are attained by the provision of a device for automatic control of field contactors, wherein the signal forming unit consists of a network of resistors one of which is coupled with the power circuit direct current transformer through a rectifier whereas the second is coupled—likewise via a rectifier—with a direct voltage transformer. The signal formed by this unit is supplied to the input of a changeover noncontact (static) relay controlling the operation of the field contactor.

It is expedient to employ a transistor asymmetric flip-flop comprising bias and feedback circuits as the changeover noncontact relay and to introduce adjustable resistors into the flip-flop bias and feedback circuits.

The proposed invention will be described further by way of example with reference to the accompanying drawings, wherein.

Figure 1:
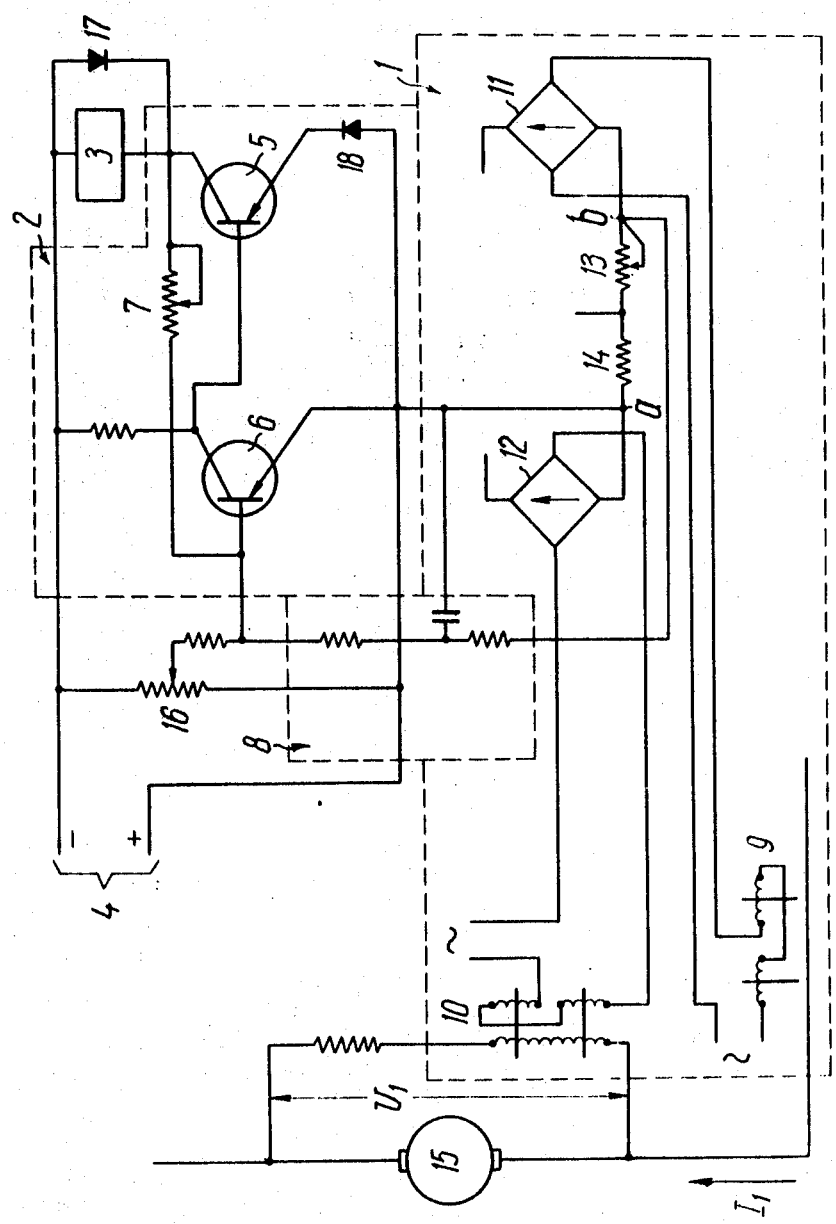
FIG. 1 shows the electric circuit diagram of the device for automatic control of the field contactors of diesel-electric and gas turbine locomotive traction motors in accordance with the present invention.

The device for automatic control of the field of traction motors (see FIG. 1) consists of signal forming unit 1 and noncontact relay 2 employing a flip-flop circuit Weakened field conditions of operation of the traction motors are established by energizing contactor coil 3 from locomotive control circuit 4 via output transistor 5 of changeover noncontact relay 2 that is, essentially, an asymmetric flip-flop circuit employing two transistors 5 and 6.

The relay input signal is supplied to the emitter-base circuit of input transistor 6. It is well known that a smooth change in the current of the input signal brings about a sudden change in the output current of the flip-flop circuit (relay characteristic). The resetting ratio of relay 2 (the ratio of the actuating and deenergizing signals) is less than unity and can be adjusted by varying the resistance of feedback resistor 7

The control signal is supplied to noncontact relay 2 from signal forming unit 1 and is smoothed by T-section RC filter 8 Signal forming unit 1 consists of direct current and voltage transformers (magnetic amplifiers) 9 and 10, rectifier bridge circuits 11 and 12 and also, resistors 13 and 14. Circuit elements 9 to 12 are frequently provided in the field control system of the traction generator of many diesel-electric locomotives and can be simultaneously used for operation of the above-described unit The control windings of direct current and stabilizing transformers 9 and 10 are inserted into the circuit of traction generator 15 and the currents flowing through resistors 13 and 14 are, consequently, in direct proportion to current $I_1$, and voltage $U_1$ of the generator. The signal voltage between points $a$ and $b$ at the ends of series-connected resistors 13 and 14 vary proportionally to difference $K_1U_1 - \alpha^K{}_2I_1$ (where $K_1$ and $K_2$ are constant proportionality factors), thus ensuring the required optimum operating characteristics of the device.

The herein-proposed device operates in the following manner

A decrease of current $I_1$ and an increase of voltage $U_1$ of traction generator 15 occur as the locomotive picks up speed. This is accompanied by an increase of the signal voltage between points $a$ and $b$ of signal forming unit 1 in accordance with the above formula. When voltage $U_1$ of traction generator 15 approaches its maximum value, the signal applied to the input of relay 2 attains opening value. As a result, the relay becomes conductive and energizes the field contactor. This process is reversed when the locomotive slows down, i.e. the signal voltage decreases and the relay becomes nonconductive at a certain value of the voltage.

Figure 2:
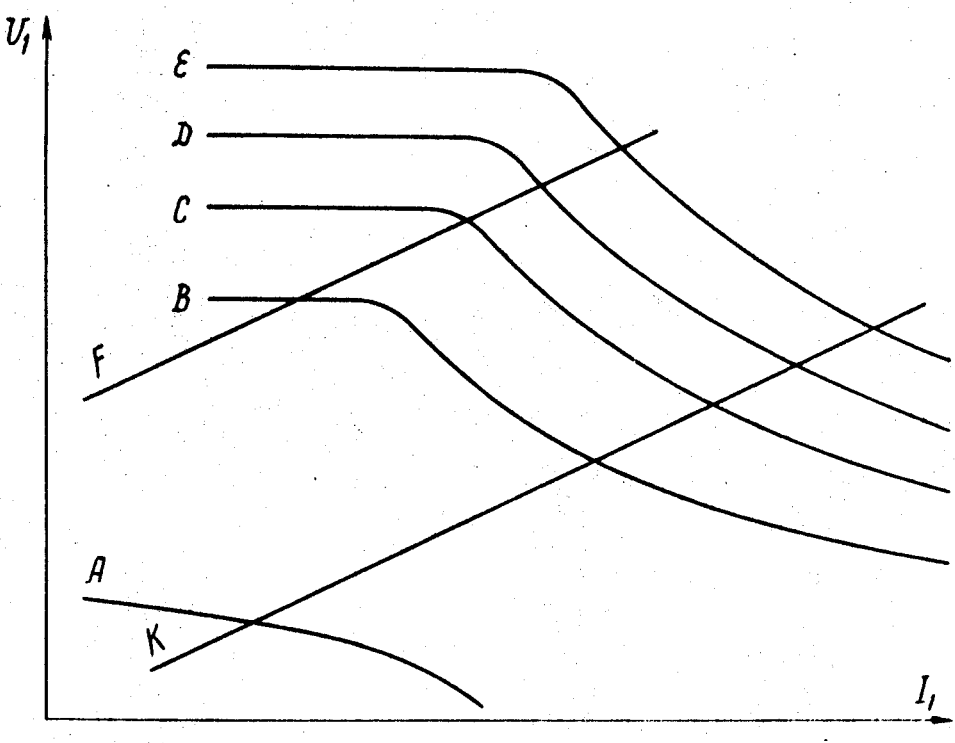
FIG. 2 shows the gating opening and closing characteristics of the changeover relay of the device in accordance with the present invention.

FIG. 2 represents the external characteristics A, B, C, D and E of the traction generator at various stages of output in $I_1$–$U_1$ coordinates and the conductivity characteristic F and nonconductivity characteristic K of the changeover noncontact relay used in the device proposed herein. The conditions under which relay 2 becomes conductive or nonconductive are determined by the points at which curves F and K intersect curves A, B, C, D and E. The conductivity and nonconductivity characteristics of the changeover relays used in the device proposed herein are inclined parallel lines. Such parallel characteristic lines are more advantageous than the diverging curves of electromagnetic relays used for this purpose as the former diminish the tendency towards unstable (fluttering) operation of the relay.

The characteristics are varied by adjusting the resistances of adjustable resistors 13 of signal forming unit 1, bias resistor 16 and feedback resistor 7 (see FIG. 1). The slope of the characteristic lines is varied by adjusting the resistance of resistor 13, the conditions at which the relay becomes conductive or nonconductive are varied simultaneously by adjusting the resistance of bias resistor 16, whereas adjustment of the resistance of feedback resistor 7 changes only the conditions at which the relay is made conductive.

Semiconductor diode 17 serves for preventing overvoltages across transistor 5 when the latter is made nonconductive diode 18 inserted into the emitter circuit of the output transistor is used for improving the reliability of blocking the relay The device proposed herein has highly stable operating characteristics that change very slightly at any changes in service conditions.

Trial tests carried out in laboratory conditions and at actual service on locomotives have confirmed the above-mentioned advantages of the device proposed herein.

The herein-proposed device for automatic control of the field of traction motors is suitable for use on electrically driven self-powered diesel-electric and gas turbine locomotives; its use is most advantageous in cases when the system of control of the locomotive traction generator is provided with DC current and voltage instrument transformers

We claim

1. A device for automatic control of the field contactors including a current for the field contactor coils of diesel-electric and gas turbine locomotive traction motors comprising a signal forming unit including a network of resistors, a direct current transformer and a direct voltage transformer, first rectifier means coupling said direct current transformer to one part of the network, second rectifier means coupling another part of the network to said direct voltage transformer, the output of the signal forming unit being connected to a changeover noncontact relay that opens and closes the circuit of the field contactor coils.

2. A device according to claim 1, wherein said changeover noncontact relay includes a transistor asymmetric flip-flop.

3. A device according to claim 2, wherein said flip-flop is provided with an adjustable resistor for adjusting the characteristics of said noncontact relay.

4. A device according to claim 1, wherein said network of resistors includes at least one variable resistor.

5. A device according to claim 1, including a locomotive control circuit and an adjustable bias resistor coupling said control circuit to said noncontact relay.